(12) United States Patent
Liebau et al.

(10) Patent No.: US 10,611,307 B2
(45) Date of Patent: Apr. 7, 2020

(54) MEASUREMENT OF A DIMENSION ON A SURFACE

(71) Applicant: Bayerische Motoren Werke Aktiengesellschaft, Munich (DE)

(72) Inventors: Daniel Liebau, Landshut (DE); Claudia Langner, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/659,956

(22) Filed: Jul. 26, 2017

(65) Prior Publication Data
US 2017/0320437 A1    Nov. 9, 2017

Related U.S. Application Data

(63) Continuation of application No. PCT/EP2016/050328, filed on Jan. 11, 2016.

(30) Foreign Application Priority Data

Jan. 27, 2015  (DE) .......................... 10 2015 201 317

(51) Int. Cl.
*B60R 1/00* (2006.01)
*G01S 17/02* (2020.01)
(Continued)

(52) U.S. Cl.
CPC .............. *B60R 1/002* (2013.01); *G01C 11/02* (2013.01); *G01C 11/06* (2013.01); *G01C 15/002* (2013.01);
(Continued)

(58) Field of Classification Search
CPC .... G01S 15/8995; G01S 15/06; G01S 15/931; G01S 2015/935; G01S 2015/937;
(Continued)

(56) References Cited

U.S. PATENT DOCUMENTS 5,208,750 A * 5/1993 Kurami ................ G05D 1/0251
701/28
5,517,419 A * 5/1996 Lanckton ................. G01C 7/04
348/148
(Continued)

FOREIGN PATENT DOCUMENTS

CH          701 106 A2    11/2010
DE    10 2012 005 966 A1    9/2013
(Continued)

OTHER PUBLICATIONS

PCT/EP2016/050328, International Search Report dated Mar. 29, 2016 (Three (3) pages).
(Continued)

*Primary Examiner* — Joseph H Feild
*Assistant Examiner* — Rufus C Point
(74) *Attorney, Agent, or Firm* — Crowell & Moring LLP

(57) ABSTRACT

The invention relates to a device, to a vehicle, and to a method for measuring a dimension between at least two points on surfaces. The device comprises an image-generating apparatus configured to scan the surroundings of the vehicle, and a display apparatus configured to display a representation of the surroundings of the vehicle. The device also includes an input apparatus configured to define at least two points as measuring points between which a dimension is to be determined in the displayed representation, a surroundings sensor configured to sense a distance and a direction of each of the measuring points with respect to the vehicle, and an evaluation apparatus configured to determine the dimension based on the sensed distances and directions of the measuring points, wherein the evaluation apparatus is further configured to output the determined dimension.

21 Claims, 7 Drawing Sheets

(51) Int. Cl.

| | | |
|---|---|---|
| *G01S 7/48* | (2006.01) | |
| *G01S 17/42* | (2006.01) | |
| *G01S 17/89* | (2020.01) | |
| *G01C 11/06* | (2006.01) | |
| *G01C 11/02* | (2006.01) | |
| *G01C 15/00* | (2006.01) | |
| *G01S 15/06* | (2006.01) | |
| *G01S 15/89* | (2006.01) | |
| *G01S 15/93* | (2020.01) | |
| *G06K 9/00* | (2006.01) | |
| *G06T 3/20* | (2006.01) | |
| *G01S 13/86* | (2006.01) | |
| *G01S 13/93* | (2020.01) | |
| *G01S 15/931* | (2020.01) | |

(52) U.S. Cl.
CPC ............ *G01S 7/4808* (2013.01); *G01S 15/06* (2013.01); *G01S 15/8995* (2013.01); *G01S 15/931* (2013.01); *G01S 17/023* (2013.01); *G01S 17/42* (2013.01); *G01S 17/89* (2013.01); *G06K 9/00791* (2013.01); *G06T 3/20* (2013.01); B60R 2300/108 (2013.01); B60R 2300/303 (2013.01); G01S 13/865 (2013.01); G01S 13/867 (2013.01); G01S 2013/9364 (2013.01); G01S 2015/935 (2013.01); G01S 2015/937 (2013.01)

(58) Field of Classification Search
CPC .............. B60R 1/002; B60R 2300/108; B60R 2300/303; G06K 9/00791; G06T 3/20
See application file for complete search history.

(56) References Cited

U.S. PATENT DOCUMENTS

| | | | |
|---|---|---|---|
| 6,195,019 B1 | 2/2001 | Nagura | |
| 7,184,088 B1 | 2/2007 | Ball | |
| 8,446,268 B2 * | 5/2013 | Hideshiro | H04N 7/181 340/435 |
| 8,736,463 B1 * | 5/2014 | Zhu | B60K 31/0008 340/933 |
| 10,300,370 B1 * | 5/2019 | Amihood | A63F 13/21 |
| 2002/0145662 A1 * | 10/2002 | Mizusawa | B60D 1/36 348/118 |
| 2004/0075847 A1 | 4/2004 | McCracken | |
| 2004/0167718 A1 * | 8/2004 | Hoenes | B60Q 9/006 701/301 |
| 2004/0247174 A1 * | 12/2004 | Lyons | G06F 3/04845 382/154 |
| 2005/0004719 A1 * | 1/2005 | Dickmann | G01S 13/931 701/1 |
| 2006/0220910 A1 * | 10/2006 | Becker | B60Q 9/006 340/932.2 |
| 2008/0130015 A1 * | 6/2008 | Lu | G01B 11/25 356/610 |
| 2008/0192984 A1 * | 8/2008 | Higuchi | G08G 1/16 382/104 |
| 2008/0267487 A1 * | 10/2008 | Siri | G06Q 10/087 382/141 |
| 2009/0207045 A1 * | 8/2009 | Jung | G06K 9/00798 340/932.2 |
| 2009/0262192 A1 * | 10/2009 | Schofield | B60R 1/00 348/148 |
| 2010/0099984 A1 * | 4/2010 | Graser | G01B 11/24 600/425 |
| 2010/0134325 A1 * | 6/2010 | Gomi | B60R 1/00 340/995.14 |
| 2010/0194596 A1 * | 8/2010 | Wang | B60R 1/00 340/936 |
| 2010/0259372 A1 * | 10/2010 | Hideshiro | G06T 3/4038 340/435 |
| 2010/0274446 A1 * | 10/2010 | Sasajima | G08G 1/14 701/36 |
| 2010/0321490 A1 * | 12/2010 | Chen | G01C 11/00 348/118 |
| 2010/0322477 A1 * | 12/2010 | Schmitt | G01S 17/00 382/103 |
| 2011/0001614 A1 * | 1/2011 | Ghneim | B60K 35/00 340/435 |
| 2011/0013201 A1 * | 1/2011 | Scherl | G01S 17/936 356/628 |
| 2011/0172534 A1 * | 7/2011 | Kim | A61B 8/14 600/443 |
| 2012/0113437 A1 | 5/2012 | Griesser | |
| 2012/0194355 A1 * | 8/2012 | Thomas | B60R 1/00 340/932.2 |
| 2012/0296523 A1 * | 11/2012 | Ikeda | B60R 1/00 701/41 |
| 2013/0002861 A1 * | 1/2013 | Mitsugi | G01C 3/00 348/135 |
| 2016/0046198 A1 * | 2/2016 | Krammer | B62D 15/025 701/22 |
| 2016/0253808 A1 * | 9/2016 | Metzler | G05D 1/0094 382/103 |
| 2017/0320437 A1 * | 11/2017 | Liebau | G01S 17/023 |
| 2019/0156507 A1 * | 5/2019 | Zeng | G06T 7/70 |

FOREIGN PATENT DOCUMENTS

| | | |
|---|---|---|
| DE | 10 2013 103 897 A1 | 10/2013 |
| EP | 0 858 055 A2 | 8/1998 |
| EP | 0 828 990 B1 | 12/1999 |
| EP | 2 120 009 A1 | 11/2009 |
| GB | 2503978 A | 1/2014 |
| JP | 3110725 B2 | 11/2000 |
| WO | WO 99/60335 A1 | 11/1999 |
| WO | WO 03/025498 A1 | 3/2003 |

OTHER PUBLICATIONS

German Search Report issued in German counterpart application No. 10 2015 201 317.0 dated Oct. 13, 2015, with Statement of Relevancy (Ten (10) pages).

* cited by examiner

MEASUREMENT OF A DIMENSION ON A SURFACE

CROSS REFERENCE TO RELATED APPLICATIONS

This application is a continuation of PCT International Application No. PCT/EP2016/050328, filed Jan. 11, 2016, which claims priority under 35 U.S.C. § 119 from German Patent Application No. 10 2015 201 317.0, filed Jan. 27, 2015, the entire disclosures of which are herein expressly incorporated by reference.

BACKGROUND AND SUMMARY OF THE INVENTION

The invention relates to a device, a vehicle and a method for measuring a dimension between at least two points on surfaces.

Different methods and devices for the two-dimensional measurement of surfaces, such as e.g. vehicle surfaces, and for the three-dimensional measurement of objects, in particular of vehicles and mailing packages, are known.

DE 10 2012 005 966 A1 discloses a device for generating a two-dimensional representation of a three-dimensional body by using parallel light to project a shadow image of the three-dimensional body.

US 2004/0075847 A1 describes a sensor arrangement for determining the height of a vehicle, wherein the vehicle to be examined can be moved between two pillars in which light-emitting and light-receiving apparatuses are arranged in such a way that the vehicle or a respective section of the vehicle interrupts the light beams between these apparatuses, so that the height of the vehicle section can be ascertained on the basis of the interrupted light beams.

CH 701 106 A2 discloses a method and a device for measuring the spatial extent of an object, wherein the vertical profile and the floor contour of a vehicle can be determined by means of two measuring arrangements, one of which is embodied as a horizontally extending light barrier arrangement and the other of which has vertically extending laser beams with a camera as an associated sensor, when the vehicle is moved through both measuring arrangements during the measuring process.

U.S. Pat. No. 6,195,019 B1 explains a device for classifying vehicles and a toll system, wherein the device for classifying vehicles is arranged above a roadway on which vehicles are moving through a detection zone which is spanned by a laser scanner. The detection zone is spanned, on the one hand, longitudinally with respect to the direction of travel and, on the other hand, transversely with respect to the direction of travel.

JP 3110725 B2 discloses a two-dimensional measurement with a plurality of measurement sensors from above.

EP 0 828 990 B1 discloses a device for determining the dimensions of an object, in particular an object on a moving conveyor for package-sorting and -handling uses. The objects to be sensed move on a conveyor belt and are scanned from above by a laser scanner.

EP 0 858 055 A2 discloses a device and a method for measuring mail items, wherein the mail items are sensed by a camera, preferably from above, and the dimensions of the mail item are determined from the acquired images.

WO 03/025498 A1 discloses a system and a method for measuring the dimensions of moving packages, wherein light beams are directed onto the object and the reflections thereof are sensed using a light detector via a parabolic mirror, and the dimensions of the object in one dimension are determined from the sensed reflections.

DE 10 2013 103 897 A1 describes a camera module for line-by-line scanning of an object with at least one linear sensor and a lens for imaging the object on the sensor. The camera module has a plurality of line sensors which are arranged at a different distance from the lens so that image lines at a different distance from the lens are imaged on the respective line sensors.

An object of the invention is to provide a device and a method for a vehicle with which dimensions of an object or a plurality of objects or between objects in the surroundings of the vehicle can be measured precisely.

The present invention relates to a device for measuring a dimension between at least two points on at least one surface for a vehicle, comprising
   at least one image-generating apparatus for scanning the surroundings of the vehicle,
   a display apparatus for displaying the representation of the surroundings of the vehicle,
   an input apparatus for defining at least two points as measuring points between which the dimensions are to be determined in the displayed representation,
   at least one surroundings sensor for sensing the distance and the direction of the measuring points with respect to the vehicle, and
   an evaluation apparatus for determining the dimension on the basis of the sensed distances and directions of the measuring points and for outputting the determined dimension.

With the device for measuring a dimension between measuring points on at least one surface, such dimensions can be determined easily and precisely using the sensor system which is already present on the vehicle.

Precise measurement of two points on at least one surface in the surroundings of a vehicle permits e.g. the measurement of passages in width and/or height, such as e.g. in the case of garage entries or gate entries. It is also possible to quickly and easily measure passages between parking or stopping vehicles, so that a vehicle driver can decide whether he wishes to drive through this passage with his vehicle. Such situations occur, e.g. when trucks park in narrow roads and block a large part of the roadway. If it is desired to drive into warehouses or depots, it may be advantageous to measure the corresponding passages in advance. This applies, in particular, if the vehicle is a large truck which cannot be readily turned. Furthermore, goods which are to be transported can be measured. This is expedient, in particular, in conjunction with vehicles which serve to transport such goods, such as e.g. industrial trucks, tractors or the like. The sensed dimensions of the goods can be stored and used during further handling of the goods. For example, passages or storage locations can be measured with the method according to the invention and used to determine whether the goods can pass through or be stored there. Furthermore, pieces of baggage which are to be stowed in the vehicle can be measured in advance. The method is preferably developed in such a way that it checks whether the pieces of baggage can be accommodated in the loading space volume, and automatically determines proposals for the arrangement of the individual pieces of baggage in the loading space volume and displays them on the display apparatus. This makes it possible to load the vehicle both densely and according to regulations.

The device according to the invention can have here one or more image-generating apparatuses from the following group:

camera,
stereo camera,
thermal imaging camera,
3D time-of-flight camera,
laser scanner or rotation laser or lidar,
radar.

Such image-generating apparatuses are often already present on vehicles.

In one preferred embodiment of the device according to the invention, one or more of the image-generating apparatuses are embodied in a rotatable or pivotable and/or zoomable fashion.

Such rotatability or pivotability makes it possible to define measuring points which it would otherwise not be possible to define when using rigidly arranged image-generating apparatuses. Making available zoomable image-generating apparatuses increases the accuracy of the definition of the measuring points in that a measuring point can be defined more precisely in the portion of the image which is enlarged by the zooming.

The device according to the invention can have one or more surroundings sensors from the following group:
stereo camera,
3D time-of-flight camera,
camera with auto-focusing apparatus or rangefinder,
optical distance-measuring device with line scan camera,
laser scanner or rotation laser or lidar,
radar,
ultrasonic sensor.

In one preferred embodiment of the device according to the invention, one or more surroundings sensors are embodied in a rotatable or pivotable fashion.

Such rotatability or pivotability makes it possible to sense the distance and direction of measuring points which it would otherwise not be possible to sense when using rigidly arranged surroundings sensors.

In a further embodiment of the device according to the invention, the at least one image-generating apparatus also constitutes the surroundings sensor or both are integrated in one sensor (housing).

The resulting advantages are that the vehicle can be cost-effectively equipped with sensors, the sensors which are present on the vehicle are used efficiently and, in particular, by means of the integration, an offset between the image-generating apparatus and the surroundings sensor is avoided. Specifically in the case of non-identical or non-integrated sensors, such an offset can, under certain circumstances, lead to a situation in which although a point on a surface can be defined as a measuring point by means of the image-generating apparatus, this measuring point cannot be sensed owing to an obstacle which is located in a direct line between the surroundings sensor and the measuring point. This is avoided by constructing one and the same sensor as an image-generating apparatus and a surroundings sensors, since the viewing direction is identical in both cases.

In one preferred embodiment of the device according to the invention, a plurality of image-generating apparatuses and/or a plurality of surroundings sensors are arranged in such a way that they point in different directions with their viewing direction.

Such an arrangement makes it possible for the entire surroundings of the vehicle to be able to be sensed without moving the vehicle.

In a further preferred embodiment of the device according to the invention, one or more image-generating apparatuses and/or one or more surroundings sensors are arranged in such a way that they scan, from the vehicle, in particular from the underside or the underfloor of the vehicle, the ground region underneath the vehicle. In addition, these sensors can be embodied with a light source as a lighting apparatus.

The scanning of the ground region makes it possible also to define and sense points located under the vehicle as measuring points. In particular this is advantageous if marks which are provided on the ground are also to be included in a measurement. In this context, a light source permits here a definition or sensing of measuring points which it would not be possible to define or sense without illumination owing to the relatively dark light conditions underneath the bodywork of the vehicle.

In one preferred embodiment of the device according to the invention, one or more driving movement sensors are provided for detecting the movement of the vehicle. In this context, the evaluation apparatus is embodied in such a way that a measuring point is respectively scanned at different vehicle positions. In this context, the movement of the vehicle is also taken into account during the determination of the dimension.

This makes it possible, in the case of vehicles which have only a low number of image-generating apparatuses or surroundings sensors, also to define or sense measuring points which are not located in the field of vision of the respective sensor. The driving movement sensors are sensors which sense the movement or trajectory of the roadway. Examples of these are specified in the following group:

Wheel rotation sensor, steering angle sensor, acceleration sensor, speedometer, rev counter in conjunction with a transmission sensor, inclination sensor, spring travel sensor or chassis sensor.

According to a further aspect of the present invention, a method is provided for measuring a dimension between at least two points of at least one surface for a vehicle, in particular having the device explained above, which method comprises the steps
scanning and generating a representation of the surroundings of the vehicle,
displaying the representation of the surroundings of the vehicle,
defining at least two points as measuring points between which the dimensions are to be determined in the displayed representation,
sensing the distance and the direction of the measuring points with respect to the vehicle,
determining the dimension on the basis of the sensed distances and directions of the measuring points and outputting the determined dimension.

In a further embodiment of the method according to the invention, the curvature of the surface between the measuring points is detected by sensing the distance and the direction of further points which lie on a virtual line or, if appropriate, projected line on the at least one surface between the measuring points from the image-generating apparatus and/or from the surroundings sensor. The curvature of the surface which is determined as a result is also taken into account during the determination of the dimension.

As a result, the three-dimensional form of surfaces is also included during the determination of a dimension.

In a further embodiment of the method according to the invention, a multiplicity of measuring points is scanned. A plan or a 3D model of the surroundings of the vehicle is produced from the data determined by means of the scanning.

As a result, such a plan or such a 3D model can be produced easily and efficiently with the sensor system present on the vehicle.

In this context, the plan can comprise a floor plan and/or an elevation.

In a further embodiment of the method according to the invention, objects which have been predetermined from sensed data are filtered out autonomously.

As a result of the autonomous filtering out, it is possible, on the one hand, to determine objects which are of interest for measurement and to offer them for measurement, and, on the other hand, the objects which are unsuitable for measurement can be detected, with the result that they are not offered for measurement. In particular, moving objects are unsuitable for measurement, since the measuring points cannot be defined or scanned without a relatively large deviation.

In a further embodiment of the method according to the invention, one or more of the following types of predetermined objects are sensed automatically by means of image analysis:
  fence,
  boundary stone,
  wall,
  ceiling of a building,
  floor,
  outer or inner edge of a building,
  roadway,
  leveling rod,
  beacon,
  post,
  passage,
  entry,
  industrial truck,
  transportation material,
  transportation pallet,
  storage rack,
  piece of baggage,
  vehicle.

As a result, the determination of dimensions or the production of plans can be carried out more quickly and efficiently.

In one advantageous embodiment of the method according to the invention, the movement of the vehicle is detected when the vehicle is moved between the sensing of the distance and the directed two measuring points. This detected movement is also taken into account during the determination of the dimension.

As a result it becomes possible to determine dimensions between measuring points and surfaces with a sensor system on the vehicle which cannot sense all the regions in the surroundings of the vehicle. Likewise, a measurement can then also be carried out when the direct view of an image-generating apparatus and/or of a surroundings sensor of a measuring point is impeded by an obstacle, for example by an object in the respective line of sight thereof. The measurement can then often be carried out by moving the vehicle between the sensing of the distance and the direction of one measuring point and the sensing of the distance and the direction of a further measuring point despite the impeding object.

In a further embodiment of the method according to the invention, the vehicle moves autonomously between the sensing of the distance and the direction of the measuring points.

By means of an autonomous movement of the vehicle, the automatic measurement of even relatively large external spaces or internal spaces is made possible. As a result, in particular plans can be produced more efficiently.

In one advantageous refinement of the method according to the invention, after the definition of a measuring point it is checked whether the measuring point can be sensed with one of the surroundings sensors.

If an image-generating apparatus and a surroundings sensor on a vehicle have an offset with respect to one another because the two are not identical sensors or are not integrated in one and the same sensor (housing), then a situation may arise in which although a measuring point can be defined on a surface in the representation of the surroundings of the vehicle which is produced by the image-generating apparatus, the surroundings sensor cannot sense the distance and the direction to the measuring point owing to an impeding object or owing to its orientation. Such checking makes it possible to display a message to the vehicle occupant who is carrying out the measurement that a defined measuring point cannot be sensed. Additionally or alternatively, in such a case a trajectory can be calculated which is displayed either for the vehicle driver to be traveled along manually, or which is traveled along autonomously by the vehicle, in order to permit one of the surroundings sensors of the vehicle nevertheless to sense the measuring point. When such a trajectory is generated, other measuring points in the surroundings of the vehicle are advantageously sensed and also included to avoid collisions during the calculation of the trajectory. In order to be able to carry out a calculation of such a trajectory more precisely, further systems or apparatuses which are present on the vehicle or the data thereof can also be included, such as for example a distance-measuring apparatus.

Dimensions can be 3D coordinates, distances, angles, diameters, radii, etc.

According to a further aspect of the present invention, a vehicle is provided which has one of the devices according to the invention explained above, wherein the device can, in particular, execute one of the methods according to the invention explained above.

The vehicle according to the invention can have a four-wheel drive and/or at least a ground clearance of at least 15 cm and preferably of at least 20 cm.

By means of such a four-wheel drive and/or such a minimum ground clearance it is possible to measure measuring points even under off-road conditions or away from paved roadways.

The invention will be explained in more detail below by way of example with reference to the drawings, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
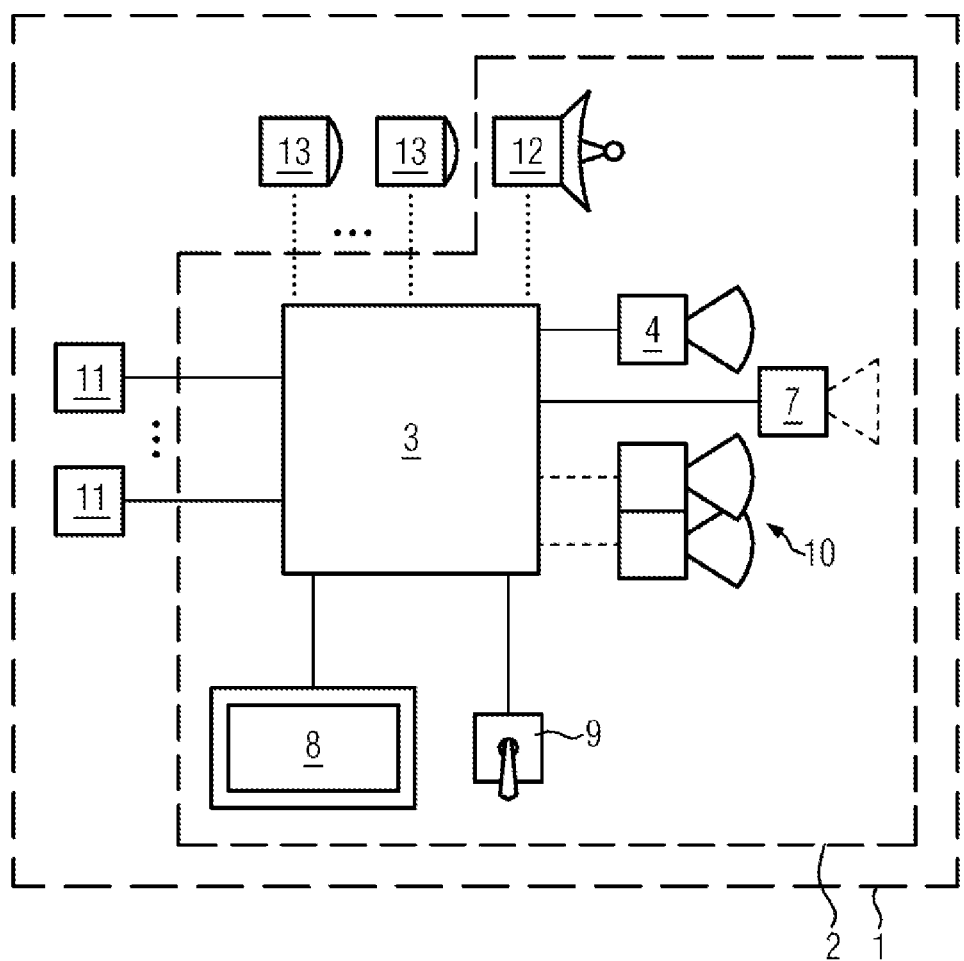
FIG. 1 is a schematic view of the design of a device for measuring a dimension between at least two points on surfaces.
Figure 2:
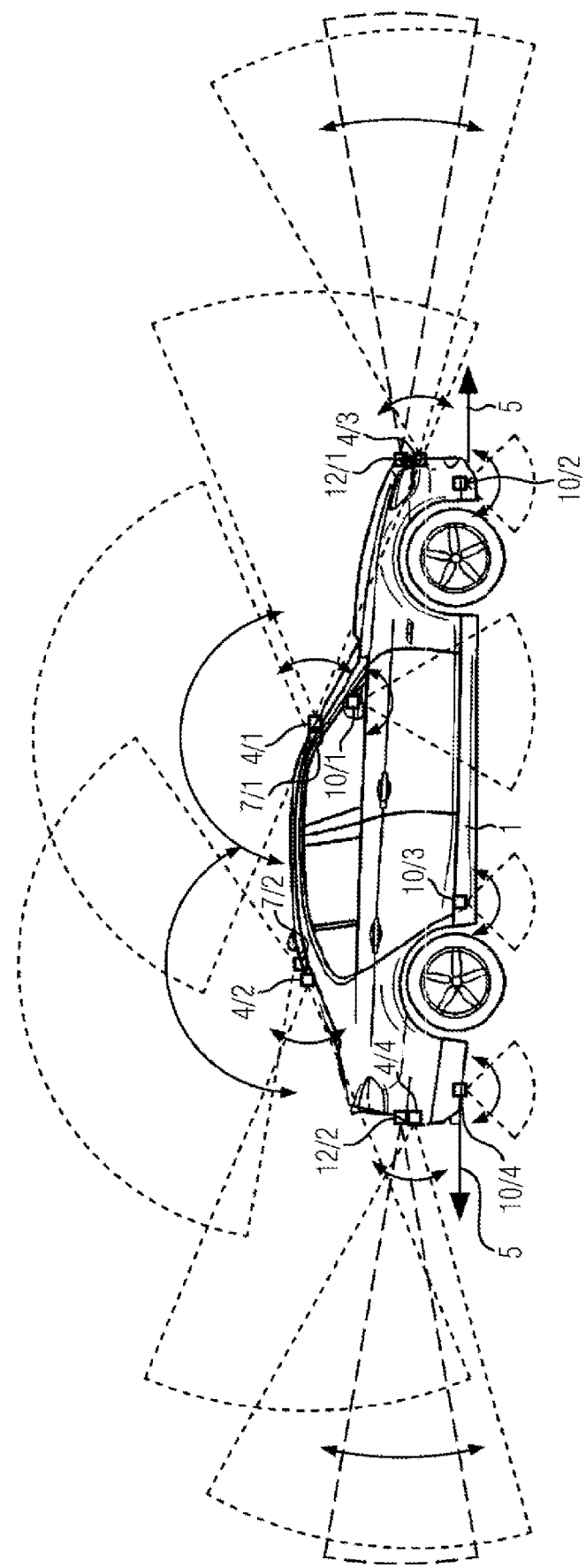
FIG. 2 is a schematic view of a vehicle having the device for measuring a dimension between at least two points on surfaces in a side view.
Figure 3:
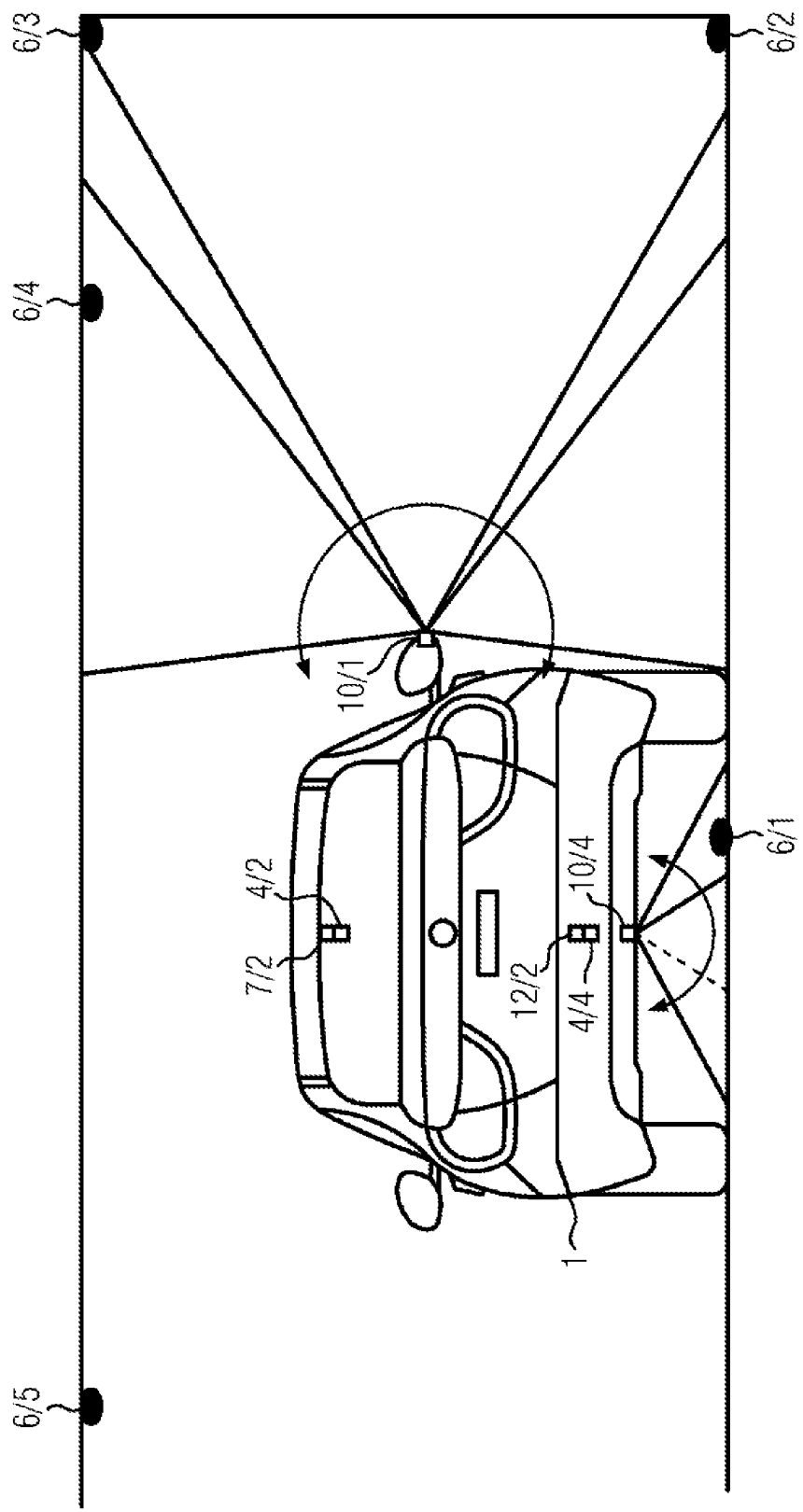
FIG. 3 is a schematic view of the vehicle from FIG. 2 in a rear view.

A first exemplary embodiment of a device for measuring a dimension between at least two points on surfaces for a vehicle will be explained below. A vehicle 1 is embodied with such a measuring device 2 (FIGS. 1, 2, 3). In particular, the vehicle 1 is a motor vehicle.

The measuring device 2 has an evaluation apparatus 3 which is embodied as a computer with a CPU memory device and suitable interfaces, and the measuring device 2 is controlled centrally. A measurement software module for processing two-dimensional and three-dimensional data is stored and can be executed on the evaluation apparatus 3. Such data can be transferred from various sensors arranged on the vehicle 1, in particular from image-generating apparatuses and/or surroundings sensors, to the evaluation apparatus 3.

The vehicle 1 is provided with a camera 4/1 which is arranged centrally at the upper edge of a front windshield of the vehicle 1 (FIG. 2). The camera 4/1 is connected to the evaluation apparatus 3 and transmits image data to the evaluation apparatus 3 via this connection and receives control commands from the evaluation apparatus 3 via said connection. The camera 4/1 is arranged on the vehicle 1 in such a way that its viewing direction is directed obliquely downward and forward in the driving direction 5 and preferably comprises actuating motors (not shown) with which it can be oriented and zoomed horizontally and vertically. The actuating motors are preferably connected to the evaluation apparatus 3 and are actuated thereby. The camera 4/1 constitutes an image-generating apparatus in the sense of the present invention which makes available image data on the basis of which points on surfaces can be defined as measuring points 6.

The vehicle 1 is provided with a lidar 7/1 which is arranged centrally above the camera 4/1 at the upper edge of the front windshield (FIG. 2). The lidar 7/1 is connected to the evaluation apparatus 3 and transmits 3D data to the evaluation apparatus 3 via this connection and receives control commands from the evaluation apparatus 3 via said connection. The lidar 7/1 is arranged on the vehicle 1 in such a way that its viewing direction is directed obliquely upward and forward in the driving direction 5 and preferably comprises actuating motors (not shown) with which it can be oriented horizontally and vertically. The actuating motors are preferably connected to the evaluation apparatus 3 and are actuated thereby. The lidar 7/1 constitutes a surroundings sensor in the sense of the present invention, which makes available three-dimensional data, in particular the distance and direction of measuring points 6, on the basis of which dimensions can be determined.

The evaluation apparatus 3 is connected to a display apparatus 8, such as e.g. an LCD screen, which is located in the interior of the vehicle 1. A representation of the surroundings of the vehicle captured by means of the camera 4/1 is displayed on the display apparatus 8. The display apparatus 8 can be of touch-sensitive design, with the result that it can be used to operate the measuring device 2, i.e. the functions of said device can be triggered or controlled.

Furthermore, the evaluation apparatus 3 is connected to an input apparatus 9 which is also located in the interior of the vehicle 1. The measuring device 2 can be operated with the input apparatus 9.

The operator control of the measuring device 2 comprises the control of an input cursor which is superimposed on the image presented on the display apparatus 8. The input cursor can be positioned on the representation of the surroundings of the vehicle at any desired points which can be selected as measuring points 6. The operator control of the measuring device 2 can also comprise the manual control of the orientation and the zoom range of the camera 4/1 and, if appropriate, the manual control of the orientation of the lidar 7/1.

The measuring device 2 is preferably connected to one or more driving movement sensors 11, from which it receives driving movement data which can also be included in the determination of the dimensions. In particular, as a result the vehicle 1 can be moved during measurement of a dimension without measuring results being falsified. The driving movement sensors are one or more of the sensors from the following group: wheel rotation sensor, steering angle sensor, acceleration sensor, speedometer, rev counter in conjunction with a transmission sensor, inclination sensor, a spring travel sensor or chassis sensor and/or other suitable sensors which sense the movement or trajectory of the vehicle.

Figure 4:
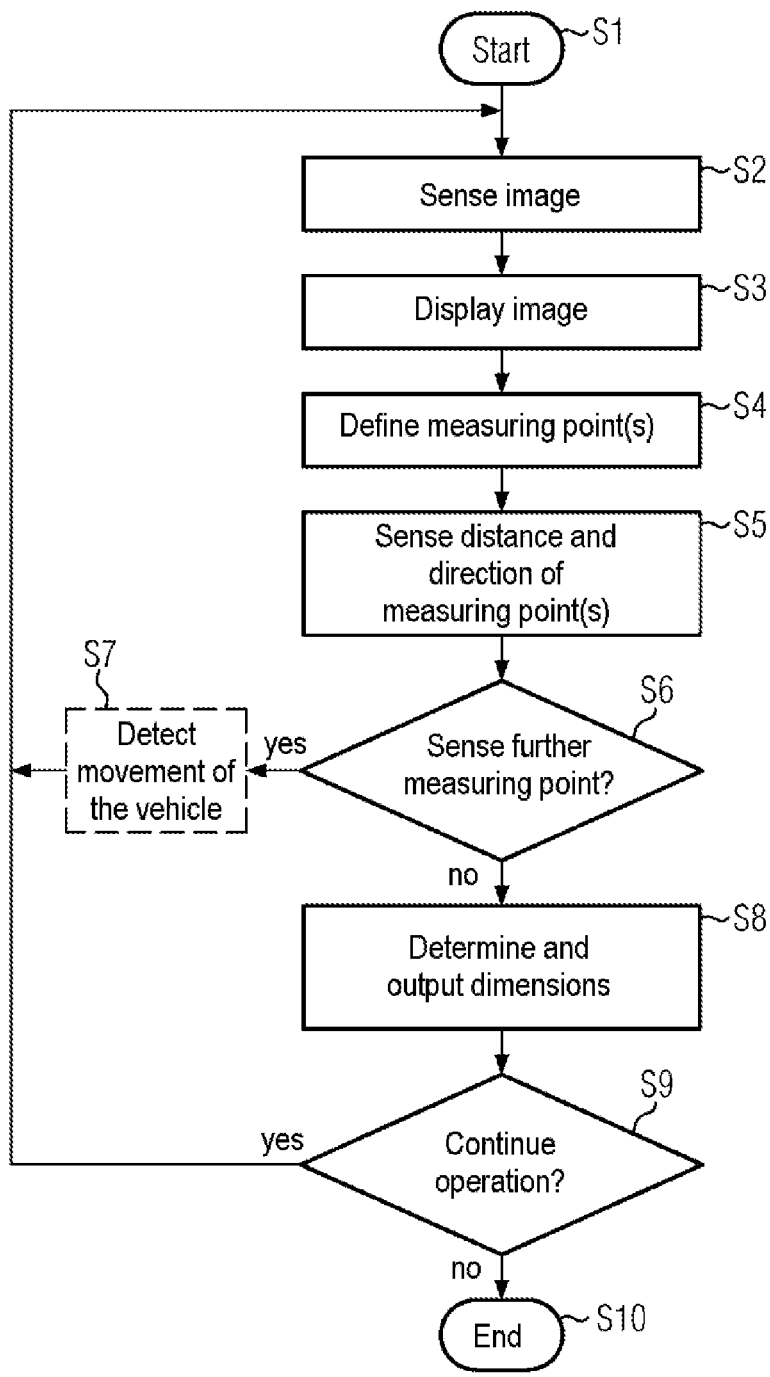
FIG. 4 shows a method for measuring a dimension between at least two points on surfaces in a flowchart.

A method for measuring a dimension between at least two points on surfaces will be explained in more detail below, said method being executed by means of the measuring device 2 explained above (FIG. 4).

The method starts in the step S1. In the step S2, an image of the surroundings of the vehicle is acquired with the camera 4/1.

In the following step S3, the acquired image is displayed on the display apparatus 8.

This is then followed by the execution of the step S4 in which one or more measuring points 6 are defined by a user of the measuring device 2 marking a measuring point 6 with the input cursor in the displayed image using the input apparatus 9. In this context, the user can manually control the camera 4/1 as explained above, with the result that the image shows the desired measuring points 6.

In the subsequent step S5, the evaluation apparatus 3 with the lidar 7/1 senses the distance and the direction of the measuring point 6 previously defined in step S4 or the measuring point 6 previously defined in step S4.

The method sequence then proceeds to the step S6 in which the user indicates whether he would like to sense a further measuring point 6. If this is the case, the step S2 is executed again.

After the execution of the step S6 and before the execution of the step S2, the step S7 can be optionally executed in which a movement of the vehicle takes place and is detected, so that the movement data of the vehicle 1 can be stored for the later determination of the dimensions. After the execution of the optional step S7, the execution of the step S2 takes place. The movement of the vehicle or the trajectory traveled along can be detected by means of the data of further driving movement sensors 11 which are present on the vehicle 1. As a result of the sensing and taking into account of the movement or trajectory of the vehicle 1 between the sensing of the measuring points 6, movement of the vehicle 1 is possible during the execution of the method without falsifying the measuring result. It is therefore also possible to determine dimensions between measuring points 6 which are not being displayed simultaneously on an image captured by the camera 4/1.

If it has been determined in the step S6 that no further measuring point 6 is to be sensed, the execution of the step S8 follows in which the dimensions between the measuring points 6 are determined from the sensed distance and direction of the respective measuring point 6 and are output on the display apparatus 8. In addition, in this context the user can be requested to specify which dimensions he would like to have displayed.

There then follows the execution of the step S9 in which it is checked whether the operation is to be continued. If the operation is to be continued, the step S2 is executed again. If the operation is not to be continued, then the execution of the step S10 follows in which the method ends.

A second exemplary embodiment of a device for measuring a dimension between at least two points on surfaces for a vehicle will be explained below.

This exemplary embodiment is of similar design to the first exemplary embodiment and comprises the same apparatuses, devices, units, etc., wherein same reference numbers are used for identical parts which have already been explained above. In FIG. 1 the additional sensors of the second exemplary embodiment are connected to the evaluation apparatus 3 by a dot-dash line.

The evaluation apparatus 3 is connected to a stereo camera 10/1. The stereo camera 10/1 can be provided together with one or more cameras 4 and one or more lidars 7. Two cameras 4 can also be used jointly as a stereo camera 10. For this purpose, the evaluation apparatus 3 has a control program module with which the two cameras 4 each simultaneously capture an image which is passed on to the evaluation apparatus 3. Furthermore, the relative position of the two cameras 4 with respect to one another and their viewing directions must also be known to the evaluation apparatus 3. The evaluation apparatus 3 can then determine the distances from specific points in the stereo image on the basis of this information and the two acquired images.

The stereo camera 10/1 is arranged in an exterior rearview mirror on a front seat passenger side of the vehicle 1 in such a way that it is directed with its viewing direction downward away from the vehicle 1. The stereo camera 10/1 preferably comprises actuating motors with which it can be oriented and zoomed horizontally and vertically. The actuating motors are preferably connected to the evaluation apparatus 3 and are actuated thereby. The stereo camera 10/1 constitutes an image-generating apparatus in the sense of the present invention, which makes available image data on the basis of which points on surfaces can be defined as measuring points 6. In addition, the stereo camera 10/1 constitutes a surroundings sensor in the sense of the present invention which makes available three-dimensional data, in particular the distance and direction of measuring points 6, on the basis of which dimensions can be determined.

The method explained above for the camera 4/1 and lidar 7/1 can be correspondingly executed with the stereo camera 10/1, wherein the stereo camera 10/1 can be used both as an image-generating apparatus and as a surroundings sensor.

In particular, with such a stereo camera 10/1 it is possible to measure pieces of baggage before the start of a journey. If the dimensions of a baggage compartment of the vehicle 1 are stored in the evaluation apparatus 3, the evaluation apparatus 3 can then determine, on the basis of the dimensions of the pieces of baggage, whether they have sufficient space in the baggage compartment. In addition, the evaluation apparatus 3 can display suggestions for the loading on the display apparatus 8, wherein the evaluation apparatus 3 can take into account loading according to regulations.

In order to measure the pieces of baggage, the vehicle can also move autonomously around the piece of baggage in order to sense possible depth dimensions of the baggage in the shadow region. Various sensing ranges of the stereo camera 10/1 which can be set using an actuating motor are shown schematically in FIG. 3.

The method explained above can be modified in such a way that the movement or trajectory of the vehicle 1 is sensed continuously, in particular between the steps S4 and S5. Such continuous sensing makes it possible to perform measurement even when there is no overlap of the sensing regions of the image-generating apparatus and of the surroundings sensor and/or if the surroundings sensor cannot sense a measuring point 6 owing to an obstacle or an offset, since the vehicle 1 can be moved in such a way that each of the measuring points 6 to be sensed can be sensed by the image-generating apparatus and then by the surroundings sensor.

If the user defines on the display apparatus 8 a measuring point 6 which cannot be sensed with one of the surroundings sensors of the vehicle 1, an instruction to move the vehicle 1 can be displayed to the user on the display apparatus 8, with the result that the surroundings sensor can sense the measuring point 6 after movement of the vehicle 1 has taken place.

Alternatively, such a movement of the vehicle 1 can also be carried out autonomously by the evaluation apparatus 3 controlling the vehicle 1. In this context, the data of the explained image-generating apparatuses and/or surroundings sensors can be used to determine a collision-free trajectory. Likewise in this context, further data from other devices or apparatuses with which the vehicle 1 is provided, such as e.g. data of a distance warning system, a parking aid system (ultrasonic sensors), etc., can also be evaluated.

Figure 5:
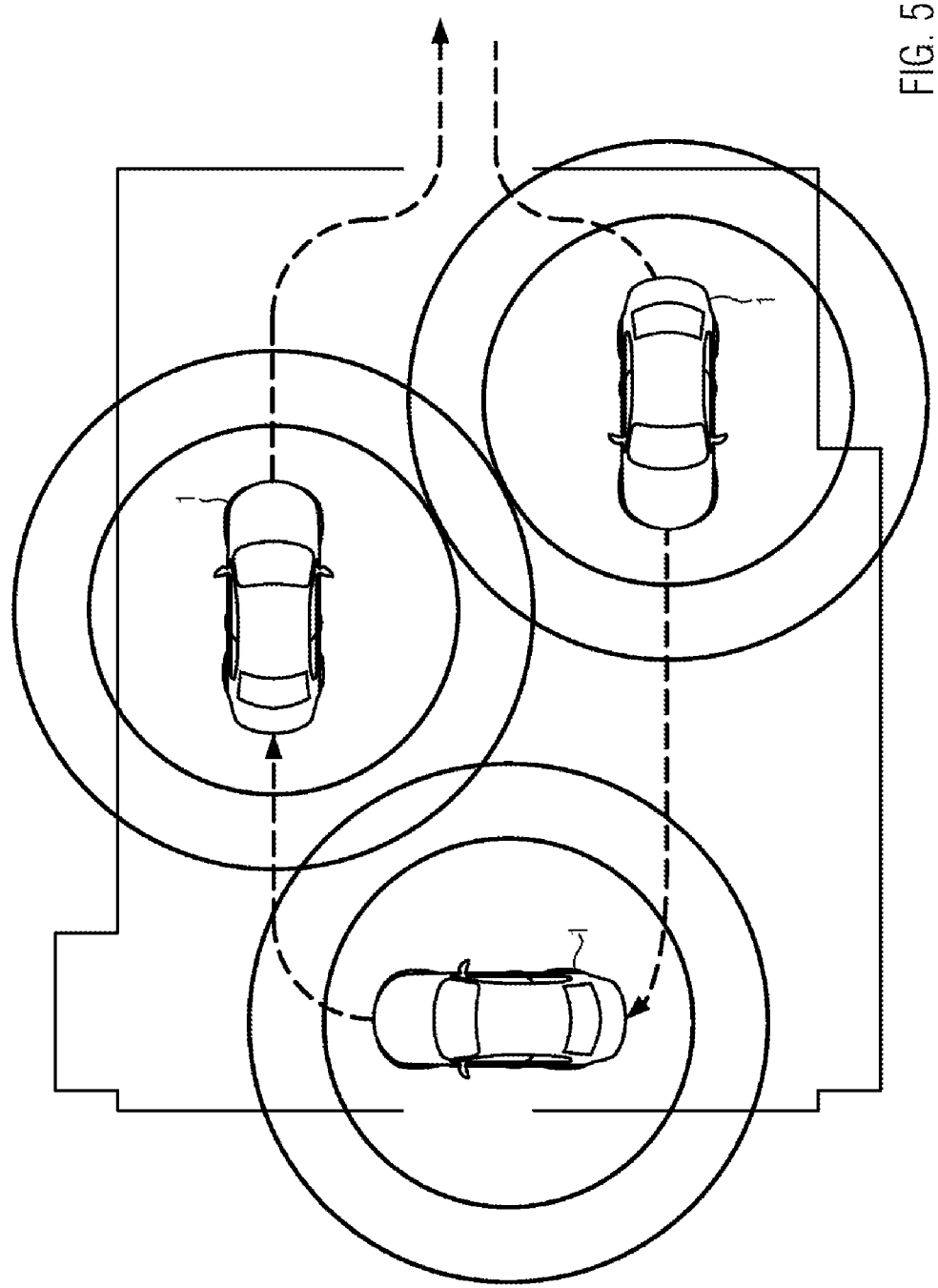
FIG. 5 is a schematic view of an autonomous measurement of an internal region of a building.

In addition, an automatic measuring mode can be provided with which the vehicle 1 measures internal areas of buildings (e.g. underground garages, storage facilities, factory buildings) or external sites (e.g. building sites, car parks, boundaries of pieces of ground) fully automatically after activation by the user by sensing a multiplicity of measuring points 6, and moves along the respective measuring area autonomously as required during the measurement process. When a multiplicity of measuring points 6 are scanned, e.g. by means of automatic image recognition software, characteristic measuring points, such as e.g. edges, corners of walls and fences, are detected and scanned at regular or irregular intervals. Fully automatic scanning of an internal area of a building or of an external site is possible by means of the definition of specific image patterns for such measuring points. Predetermined obstacles or additionally present objects, such as e.g. persons or animals, are preferably also automatically removed from the data. From the data which is acquired as a result it is possible to produce a plan, in particular a floor plan and/or elevation, or a 3D model of the surroundings of the vehicle. Such autonomous measurement of an internal area of a building is shown schematically in FIG. 5, wherein the dashed line indicates a collision-free roadway which is driven along autonomously.

Additionally or alternatively, the sensing of dimensions during the travel of the vehicle 1 can take place in such a way that obstacles on the roadway or passage widths are sensed automatically and their dimensions are determined. If the vehicle 1 does not pass an obstacle or does not pass through a passage, a warning is preferably output on the display apparatus 8 and/or on a loudspeaker (not shown)

which is connected to the evaluation apparatus 3. During such sensing of passage widths, dimensions of loading materials, in particular in the case of movement by means of an industrial truck (forklift truck, pallet truck etc.) which constitutes the vehicle 1, can also be sensed manually or automatically and also taken into account.

In addition, in the method explained above checking can take place between the steps S4 and S5 to determine whether a measuring point 6 which is marked in the representation of the surroundings of the vehicle can be sensed by the surroundings sensor. This is advantageous, in particular, in the case of an offset between the image-generating apparatus and the surroundings sensor, i.e. if the two are not identical to one another, as well as in the case of obstacles which do not impede the image-generating apparatus but do impede the sensing path of the surroundings sensor. By means of such checking it can be ensured that a measuring point 6 which has been previously marked in the two-dimensional representation can also be sensed in a three-dimensional fashion. Such checking can be carried out by means of various methods which depend on the available sensors. Two methods with which such checking can take place are explained below.

In the first checking method, a camera 4 is used as an image-generating apparatus, and a lidar 7 is used as a surroundings sensor. The evaluation apparatus 3 directs the laser beam of the lidar 7 onto the measuring point 6 after the definition of a measuring point 6 in the step S4, and said evaluation apparatus 3 determines with the camera 4 whether the measuring point 6 is illuminated by the laser beam. The orientation of the laser beam can take place iteratively here, i.e. the evaluation apparatus 3 corrects the orientation of the laser beam using the images acquired by the camera 4 until the measuring point 6 is illuminated by the laser beam, or a predetermined number of illumination attempts is reached or a predetermined time has passed. If the measuring point 6 is not illuminated by the laser beam, a fault message can be output, if appropriate with a driving instruction for the vehicle driver, or the evaluation apparatus moves the vehicle 1 autonomously in such a way that the measuring point 6 can be illuminated by the laser beam.

In the second checking method, a three-dimensional scan of the surroundings of the vehicle is carried out with at least one of the surroundings sensors and compared or linked, by means of suitable image analysis methods, with the representation of the surroundings of the vehicle generated by the image-generating apparatus. In this context, in particular, edge profiles as well as the structure and/or color of surfaces can also be taken into account, in order to combine the two-dimensional image with the three-dimensional data. The distortions of the three-dimensional structures with respect to the two-dimensional representation which occur, in particular, as a result of an offset between the image-generating apparatus and the surroundings sensor, can be eliminated here by means of interpolation methods. By applying such a method it is possible to determine the occurrence of an obstacle which blocks the path of the surroundings sensor to the measuring point 6. The three-dimensional scan of the surroundings of the vehicle can be executed very approximately in comparison with the determination of the distance with the surroundings sensor and serve merely to estimate the presence of objects between the measuring apparatuses and the target areas.

In addition, in the method explained above, objects which are to be measured or can be measured and which are proposed to the user for measurement during the displaying of the image in the step S3 can be extracted, by the image-processing software module between the steps S2 and S3, from the images which are acquired with the one or more image-generating apparatuses. Such objects are preferably an object defining a space or an area, such as e.g. fences, boundary stones, walls, ceilings of buildings, floors, outer or inner edges of a building, roadways, leveling rods, beacons, posts, passages, entries, industrial trucks, transportation materials, transportation pallets, storage racks, pieces of baggage, vehicles. An extraction of objects can be carried out using a pattern comparison on the basis of the acquired 2D data. In this context, movable or moving objects are eliminated so that only static or immovable or unmoved objects remain. In order to be able to carry out the extraction of objects more precisely and efficiently, 3D data of the surroundings sensors can also be included. For this purpose, a three-dimensional scan of the surroundings can take place, as has already been explained above.

Alternatively or additionally, moving objects can also be eliminated by means of multiple sensing of 2D and/or 3D data over a predetermined time interval and comparisons of the acquired data with one another. If moving objects are present in the data, their position may have changed, and their position can therefore be detected or eliminated.

Additionally or alternatively, the measuring device 2 can also propose, in the representation of the objects which are to be measured or can be measured, dimensions which are to be sensed such as 3D coordinates, distances (e.g. height, breadth, width, depth, length), angles, diameters, radii for measurement, which are then executed automatically. It is also possible to perform further differentiation according to, for example, minimum/maximum/average dimensions. For example, the interrogation: "Is the maximum height/breadth of the object to be measured?" can occur. A measuring instruction can also be input by voice control, such as e.g.: "Calculate the average of all the radii along an edge of the object" or "Determine the minimum and maximum angle of the area zoomed into".

Additionally or alternatively, the curvature of the surface between the measuring points 6 can be detected by sensing the distance and the direction of further points which lie on a virtual line or, if appropriate, projected line on the surface between the measuring points 6 from the image-generating apparatus and/or from the surroundings sensor. As a result, the three-dimensional form of surfaces can also be included during the determination of a dimension, so that e.g. not only a direct distance between measuring points 6, but also the length of a path between the two measuring points 6 can be determined, wherein the path can extend along the surface. The definition and the scanning of the further points preferably occur here automatically. In particular, with the data acquired in this way it is possible to produce 3D models of surfaces or objects in the surroundings of the vehicle.

The vehicle 1 can be provided, in addition to or as an alternative to the camera 4/1, with one or more further cameras 4/2, 4/3 and/or 4/4, as shown in FIG. 2. While the camera 4/2 is arranged centrally at the upper edge of a rear windshield of the vehicle 1, the camera 4/3 is arranged centrally on a front bumper of the vehicle 1, and the camera 4/4 is arranged centrally on a rear bumper of the vehicle 1. While the viewing direction of the camera 4/2 is directed obliquely downward and rearward in the direction of travel 5, the viewing direction of the camera 4/3 is directed horizontally forward in the direction of travel 5 and the viewing direction of the camera 4/4 is directed horizontally rearward in the direction of travel 5. The cameras 4/2, 4/3 and 4/4 are connected to the evaluation apparatus 3, have the same functions and preferably comprise actuating motors, as explained above for the camera 4/1. The cameras 4 can also be a component of one of the stereo cameras 10. The method explained above for the camera 4/1 can be correspondingly carried out with the cameras 4/2, 4/3 and 4/4.

Likewise, the vehicle 1 can be provided, in addition to or as an alternative to the lidar 7/1, with one or more further lidars 7. In FIG. 2, a lidar 7/2 is shown which is arranged centrally above the camera 4/2 at the upper edge of the rear windshield, and whose viewing direction is directed obliquely upward and downward in the direction of travel 5. The lidar 7/2 is connected to the evaluation apparatus 3, has the same functions and preferably comprises actuating motors, as explained above for the lidar 7/1. The method explained above for the lidar 7/1 can be correspondingly carried out with the lidar 7/2.

In addition to or as an alternative to the stereo camera 10/1, the vehicle 1 can be provided with further stereo cameras 10/2, 10/3 and/or 10/4 which are arranged on the underside of the vehicle 1, as shown in FIG. 2. The viewing directions of the stereo cameras 10/2, 10/3 and 10/4 are directed onto the ground underneath the vehicle 1. For example, marks on the ground can be sensed and scanned with the stereo cameras 10/2, 10/3 and 10/4 and therefore measured or included in the measurements. The stereo cameras 10/2, 10/3 and 10/4 are connected to the evaluation apparatus 3, have the same functions and preferably comprise actuating motors as explained above for the stereo camera 10/1. The stereo cameras 10/2, 10/3 and 10/4 can have light sources as lighting apparatuses, with the result that the ground under the vehicle 1 can be illuminated and therefore the quality of the representations displayed on the display apparatus 8 can be improved. The method explained above for the stereo camera 10/1 can be correspondingly carried out with the stereo cameras 10/2, 10/3 and 10/4.

The device explained above or the method explained above for measuring a dimension between at least two points on surfaces can be refined in a wide variety of ways, wherein these refinements are explained below. In FIG. 1, the additional sensors of the refinements are connected to the evaluation apparatus 3 with a dot-dash line.

According to a first refinement, the vehicle 1 has, in addition to or as an alternative to the stereo camera 10/1, a stereo camera (not shown) on an exterior rear view mirror on a driver's side of the vehicle 1. This stereo camera is arranged, precisely like the stereo camera 10/1, in such a way that it is directed with its viewing direction downward away from the vehicle 1 and is connected to the evaluation apparatus 3. Said stereo camera has the same functions and preferably comprises actuating motors as explained above for the stereo camera 10/1. The method explained above for the stereo camera 10/1 can be correspondingly carried out with this stereo camera on the driver's side.

According to a second refinement, in addition to or as an alternative to the surroundings sensors (lidar 7, stereo camera 10) explained above, the vehicle 1 can be provided with a radar 12/1 and/or 12/2 as a surroundings sensor, as shown in FIGS. 1 and 2. The radar 12/1 is arranged centrally above the camera 4/3 on the front bumper of the vehicle 1, and the radar 12/1 is arranged centrally above the camera 4/4 on the rear bumper of the vehicle 1. While the viewing direction of the radar 12/1 is directed horizontally forward in the direction of travel 5, the viewing direction of the radar 12/2 is directed horizontally rearward in the direction of travel 5. The radar 12/1 and 12/2 are connected to the evaluation apparatus 3, have the same functions and preferably comprise actuating motors as explained above for the lidar 7/1.

In addition to or as an alternative to the surroundings sensors explained above, the vehicle 1 can be provided with one or more ultrasonic sensors 13 as a surroundings sensor, as shown in FIG. 1. The ultrasonic sensors 13 are connected to the evaluation apparatus 3, have the same functions and preferably comprise actuating motors as explained above for the lidar 7/1. By means of the ultrasonic sensors 13, which are often already present on vehicles 1 as part of a parking aid system, it is possible to perform measurements, in particular in the relatively close surroundings around the vehicle 1.

Figure 6:
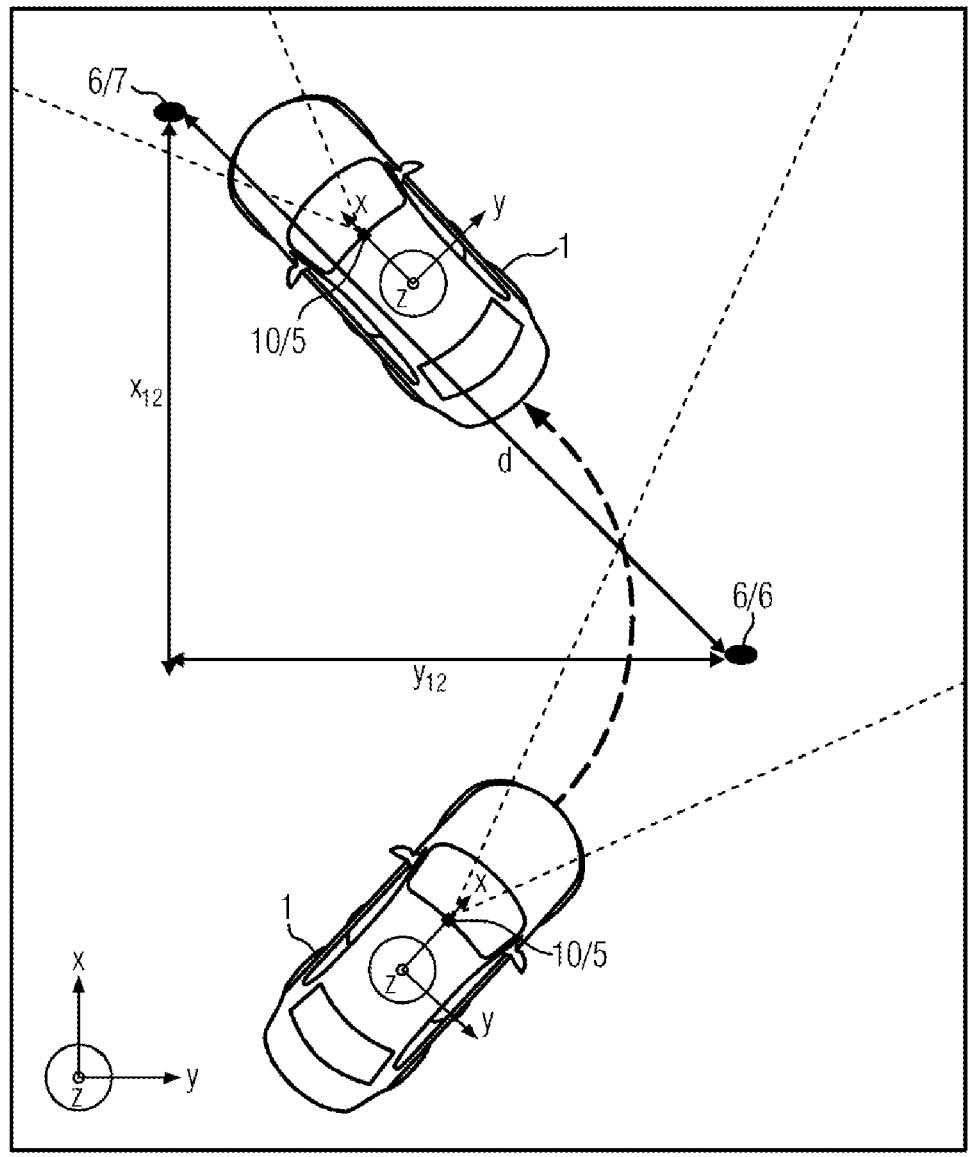
FIG. 6 is a schematic view of a movement of the vehicle between the definition or the sensing of two different measuring points.
Figure 7:
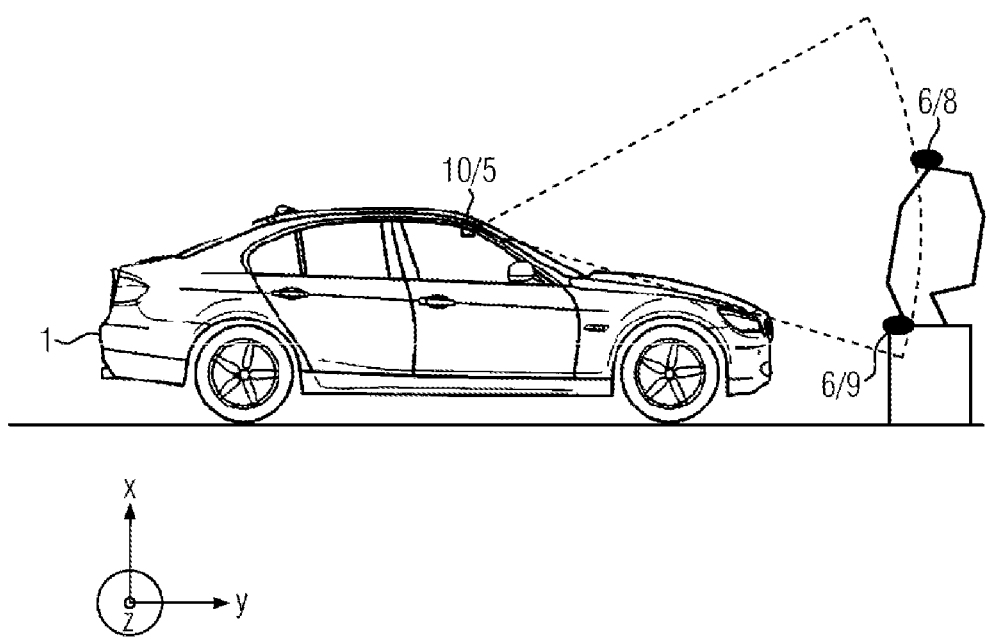
FIG. 7 is a schematic view of a measurement of two different measuring points of an object.

In FIGS. 6 and 7, the vehicle 1 is shown with a stereo camera 10/5 which is arranged centrally at the upper edge of the front windshield of the vehicle 1 in such a way that it is directed with its viewing direction forward from the vehicle 1 in the direction of travel 5. The stereo camera 10/5 is connected to the evaluation apparatus 3, has the same functions and preferably comprises actuating motors as explained above for the stereo camera 10/1. The method explained above for the stereo camera 10/1 can be correspondingly carried out with the stereo camera 10/5.

FIG. 6 is a schematic view of a movement of the vehicle 1 between the definition or the sensing of two different measuring points 6/6 and 6/7 by means of the stereo camera 10/5 in an interior space of a building. In this context, the dashed line indicates a roadway of the vehicle 1 which is driven along during the measurement process. Firstly, the measuring point 6/6 is defined and measured, then the vehicle 1 is moved and subsequently the measuring point 6/7 is defined and measured.

FIG. 7 is a schematic view of a measurement of two different measuring points 6/8 and 6/9 of an object by means of the stereo camera 10/5. The object is a sculpture here. Firstly, the measuring point 6/8 is defined and measured and subsequently the measuring point 6/9 is defined and measured.

Basically, a plurality of various types of sensor are suitable as image-generating apparatus or surroundings sensors which can be arranged at different locations on the vehicle 1 and directed in different directions. The respective positions of the installed sensors on the vehicle 1 and their possible orientation are stored in this case in the evaluation apparatus.

An image-generating apparatus in the sense of the present invention is a camera 4, a stereo camera 10, a thermal imaging camera or infrared camera, a 3D time-of-flight camera, a lidar 7 and a radar 12. In this context, representations of the surroundings of the vehicle can be calculated in the form of two-dimensional data from the 3D data generated by the sensors which sense in a three-dimensional fashion. The thermal imaging camera or infrared camera can also serve to detect living beings, in particular persons and animals. These living beings can be removed from the data if e.g. plans are produced automatically.

A surroundings sensor in the sense of the present invention is a lidar 7, a stereo camera 10, a 3D time-of-flight camera, a camera with auto-focusing apparatus or rangefinder, an optical distance-measuring device with line scan camera, a radar 12 and/or an ultrasonic sensor 13. Basically, any surroundings sensor can also be used as an image-generating apparatus, since representations of the surroundings of the vehicle in the form of two-dimensional data can be calculated from the generated 3D data.

This data of the surroundings of the vehicle can be used as reference points relative to a measuring object. It is therefore possible, for example, to measure the 3D object coordinates relative to spatial coordinates. For example, it may be appropriate to position and orient an object at a specific spatial coordinate. In this context it is expedient to use the surroundings sensors to know the position/coordinates of the vehicle relative to the spatial coordinates, and in the further step the object coordinates relative to the vehicle coordinates, in order to be able to infer the object coordinates relative to the space.

Basically, the settings of the actuating motors explained above can be performed by the operator by means of the input apparatus 9 and/or a touch-sensitive display apparatus 8. The zoom function permits the operator here to determine a measuring point 6 more precisely by virtue of the fact that the image-generating apparatus senses a representation of the surroundings of the vehicle which is zoomed in, i.e. enlarged, and is displayed on the display apparatus 8.

LIST OF REFERENCE NUMBERS

1 Vehicle
2 Measuring device
3 Evaluation apparatus
4 Camera
5 Direction of travel
6 Measuring point
7 Lidar
8 Display apparatus
9 Input apparatus
10 Stereo camera
11 Driving movement sensor
12 Radar
13 Ultrasonic sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device configured to measure dimensions between at least three points on at least one surface of at least one object in a surroundings of a vehicle, the device comprising:
    an image-generating apparatus configured to scan the surroundings of the vehicle;
    a display apparatus configured to display a representation of the surroundings of the vehicle;
    an input apparatus configured to define the at least three points on the at least one surface of the at least one object, the at least one object being separate from the vehicle, the defining being via user selection of corresponding measuring points in the displayed representation;
    a surroundings sensor configured to sense a distance and a direction of each of the points with respect to the vehicle so as to determine 3D object coordinates relative to spatial coordinates; and
    an evaluation apparatus configured to:
        determine the dimensions between the at least three points based on the sensed distances and directions of the at least three points with respect to the vehicle, and
        output the determined dimensions.

2. The device as claimed in claim 1, wherein the image-generating apparatus is one of a camera, a stereo camera, a thermal imaging camera, a 3D time-of-flight camera, a laser scanner, a rotation laser, a lidar, and a radar.

3. The device as claimed in claim 1, wherein the image-generating apparatus is configured in at least one of a rotatable, pivotable and zoomable fashion.

4. The device as claimed in claim 1, wherein the surroundings sensor is one of a stereo camera, a 3D time-of-flight camera, a camera with auto-focusing apparatus or rangefinder, an optical distance-measuring device with line scan camera, a laser scanner, a rotation laser, a lidar, a radar, and an ultrasonic sensor.

5. The device as claimed in claim 1, wherein the surroundings sensor is configured in at least one of a rotatable and pivotable fashion.

6. The device as claimed in claim 1, wherein the image-generating apparatus comprises the surroundings sensor.

7. The device as claimed in claim 1, further comprising a plurality of image-generating apparatuses and/or a plurality of surroundings sensors that are arranged to point in different directions with respect to corresponding viewing directions.

8. The device as claimed in claim 1, wherein at least one of the image-generating apparatus and surroundings sensor is arranged to scan a ground region underneath the vehicle.

9. The device as claimed in claim 1, further comprising a driving movement sensor configured to detect a movement of the vehicle, and wherein the evaluation apparatus is further configured such that a respective measuring point is scanned at different vehicle positions, wherein the movement of the vehicle is also taken into account during the determination of the dimension.

10. A method for measuring dimensions between at least three points of at least one surface of at least one object in a surroundings of a vehicle, the method comprising the acts of:
    scanning and generating a representation of the surroundings of the vehicle;
    displaying the representation of the surroundings of the vehicle;
    defining the at least three points on the at least one surface of the at least one object, the at least one object being separate from the vehicle, the defining being via user selection of corresponding measuring points in the displayed representation;
    sensing a distance and a direction of each of the points with respect to the vehicle so as to determine 3D object coordinates relative to spatial coordinates;
    determining the dimensions between the at least three points based on the sensed distances and directions of the at least three points with respect to the vehicle; and
    outputting the determined dimensions.

11. The method as claimed in claim 10, further comprising detecting a curvature of one of the at least one surface between the measuring points by sensing distances and directions of further points that lie on one of a virtual line and a projected line on the surface between the measuring points from the image-generating apparatus and/or from the surroundings sensor, wherein the curvature is also taken into account during the determination of the dimension.

12. The method as claimed in claim 10, further comprising:
    scanning a plurality of measuring points; and
    producing a plan or a 3D model of the surroundings of the vehicle from data determined by said scanning of the plurality of measuring points.

13. The method as claimed in claim 12, wherein the plan comprises a floor plan and/or an elevation.

14. The method as claimed in claim 10, further comprising filtering out objects that have been predetermined from sensed data on an autonomous basis.

15. The method as claimed in claim 10, further comprising sensing, automatically by image analysis, at least one predetermined object, wherein the predetermined object is one of a fence, a boundary stone, a wall, a ceiling of a building, a floor, an outer or inner edge of a building, a roadway, a leveling rod, a beacon, a post, a passage, an entry, an industrial truck, transportation material, a transportation pallet, a storage rack, a piece of baggage, and a vehicle.

16. The method as claimed in claim 10, further comprising:
- moving the vehicle between at least two instances of said sensing of the distances and the directions of the measuring points;
- detecting said moving of the vehicle; and
- taking said detected moving of the vehicle into account during the determining of the dimension.

17. The method as claimed in claim 16, wherein said moving the vehicle comprises moving the vehicle autonomously between the at least two instances of said sensing of the distances and the directions of the measuring points.

18. The method as claimed in claim 10, further comprising checking, after defining one of the at least two points as a measuring point, whether the measuring point can be sensed with the surroundings sensor.

19. The method as claimed claim 10, wherein the dimension is one of 3D coordinates, a distance, an angle, a diameter, and radii which can also be classified with minimum, maximum and average values.

20. A vehicle comprising a device that is configured to measure a dimensions between at least three points on at least one surface of at least one object in a surroundings of a vehicle, wherein the device comprises:
- an image-generating apparatus configured to scan the surroundings of the vehicle;
- a display apparatus configured to display a representation of the surroundings of the vehicle;
- an input apparatus configured to define the at least three points on the at least one surface of the at least one object, the at least one object being separate from the vehicle, the defining being via user selection of corresponding measuring points in the displayed representation;
- a surroundings sensor configured to sense a distance and a direction of each of the points with respect to the vehicle so as to determine 3D object coordinates relative to spatial coordinates; and
- an evaluation apparatus configured to:
  - determine the dimensions between the at least two points based on the sensed distances and directions of the at least three points with respect to the vehicle, and
  - output the determined dimensions.

21. The vehicle as claimed in claim 20, wherein the vehicle has a four-wheel drive and/or a ground clearance of at least 15 cm.

* * * * *